US008340687B2

(12) United States Patent
Kahn et al.

(10) Patent No.: US 8,340,687 B2
(45) Date of Patent: Dec. 25, 2012

(54) METHOD AND APPARATUS FOR ACTIVATING A BASE STATION

(75) Inventors: Colin Leon Kahn, Cedar Knolls, NJ (US); Thierry Etienne Klein, Fanwood, NJ (US); Agnes C. Tow, Middletown, NJ (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1359 days.

(21) Appl. No.: 11/769,839

(22) Filed: Jun. 28, 2007

(65) Prior Publication Data

US 2009/0005074 A1    Jan. 1, 2009

(51) Int. Cl.
*H04W 24/00* (2009.01)
*H04M 11/04* (2006.01)
*H04B 7/00* (2006.01)

(52) U.S. Cl. .................... 455/456.2; 455/404.1; 455/521

(58) Field of Classification Search ................ 455/456.2, 455/446, 414.1, 404, 521, 41.1, 41.2
See application file for complete search history.

(56) References Cited

U.S. PATENT DOCUMENTS

| | | | | |
|---|---|---|---|---|
| 5,781,582 A | * | 7/1998 | Sage et al. | 375/134 |
| 6,380,888 B1 | * | 4/2002 | Kucik | 342/357.31 |
| 7,324,837 B2 | * | 1/2008 | Yamakita | 455/561 |
| 7,375,588 B2 | * | 5/2008 | Yamakawa et al. | 330/289 |
| 7,477,906 B2 | * | 1/2009 | Radic et al. | 455/456.2 |
| 2005/0206555 A1 | * | 9/2005 | Bridgelall et al. | 342/127 |
| 2006/0071784 A1 | * | 4/2006 | Frank | 340/539.22 |
| 2008/0014981 A1 | * | 1/2008 | Venkatachalam | 455/528 |

OTHER PUBLICATIONS

"911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.

* cited by examiner

*Primary Examiner* — Kent Chang
*Assistant Examiner* — Scott Au
(74) *Attorney, Agent, or Firm* — Wall & Tong, LLP (57) ABSTRACT

The invention includes a method and apparatus for activating a base station. A method includes transitioning the base station to a first state in which at least one base station activation activity is performed and RF transmissions are disabled, and transitioning the base station from the first state to a second state in which RF transmissions are enabled. The at least one base station activation activity may include at least one of warming at least one power amplifier, setting at least one base station configuration parameter, establishing GPS synchronization, and other base station activation activities. The base station may transition from the first state to the second state in response to a trigger.

18 Claims, 7 Drawing Sheets

FIG. 7

METHOD AND APPARATUS FOR ACTIVATING A BASE STATION

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

Currently, base stations are deployed to the field in fixed infrastructure networks in which deployment time, and the time that is required to activate the base stations to provide service, is less critical than during emergency response situations. Disadvantageously, base station activation time (during which the base station cannot provide any service) is typically around ten to fifteen minutes, and possibly even longer. This base station activation time is unacceptably large during emergencies situations, where every minute is important. An alternative solution used during emergency situations is to keep the base stations activated and continuously transmitting, however, this requires a constant source of power, even when the base stations are not being used.

SUMMARY OF THE INVENTION

Various deficiencies in the prior art are addressed through the invention of a method and apparatus for activating a base station. A first method includes transitioning the base station to a first state in which at least one base station activation activity is performed and RF transmissions are disabled, and transitioning the base station from the first state to a second state in which RF transmissions are enabled. The at least one base station activation activity may include at least one of warming at least one power amplifier, setting at least one base station configuration parameter, establishing GPS synchronization, and other base station activation activities. The base station may transition from the first state to the second state in response to a trigger.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of activating base stations in a rapidly deployable wireless network (denoted herein as a 911 network on wheels, i.e., 911-NOW); however, the present invention is applicable to activating base stations in various other networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
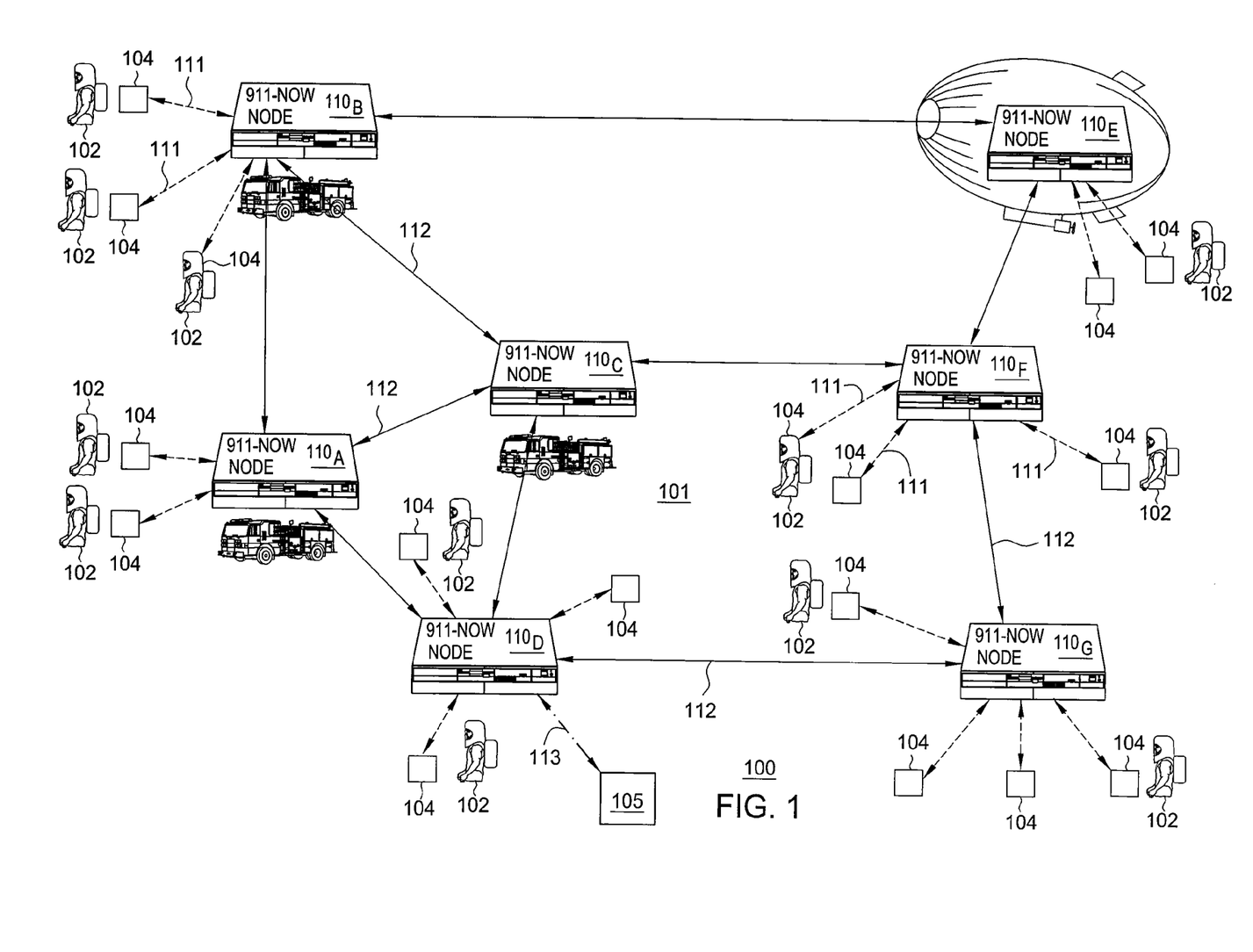
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes $110_A$-$110_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various services, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node $110_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution-Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, core networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
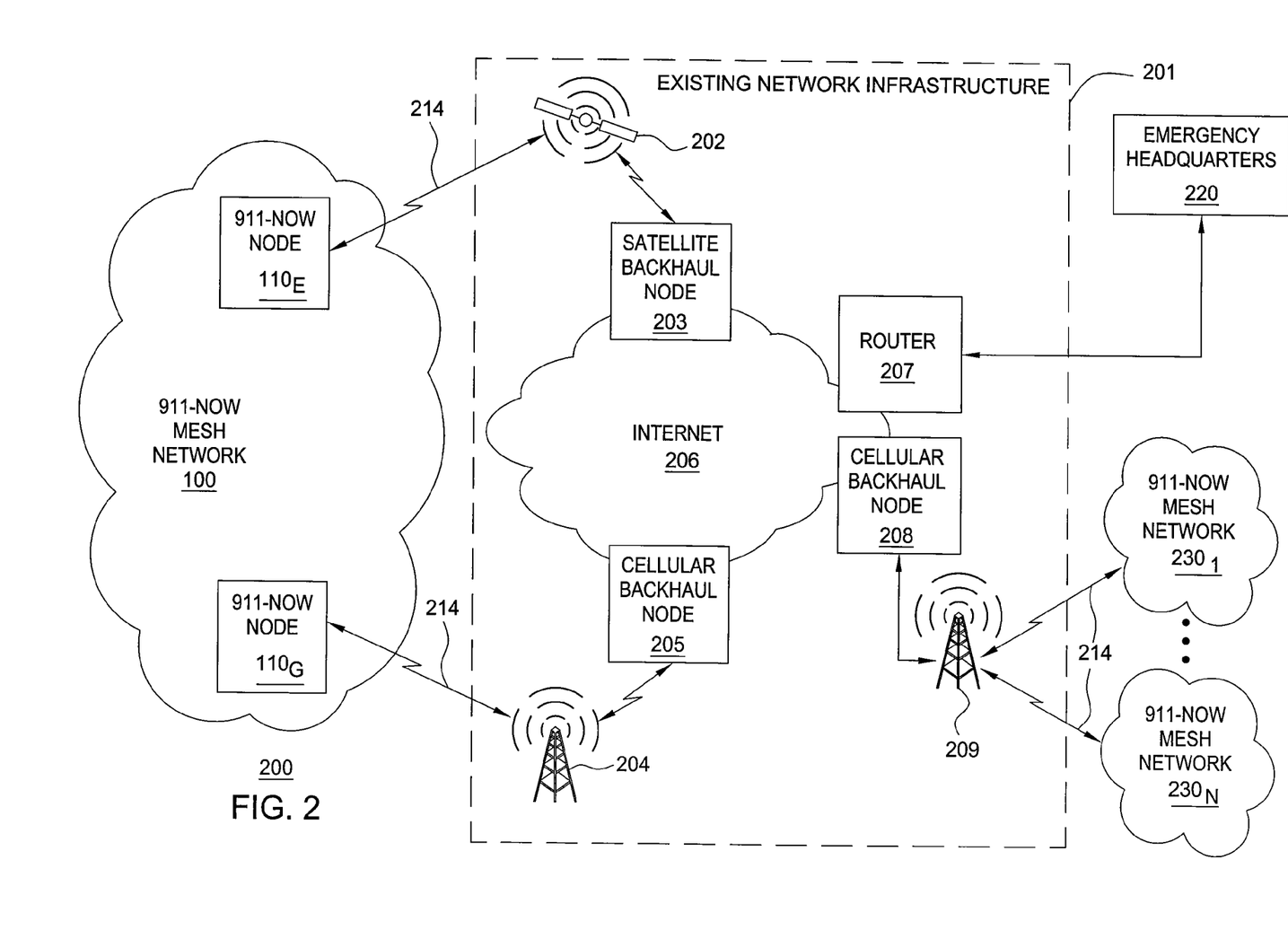
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node 110$_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node 110$_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks 230$_1$-230$_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
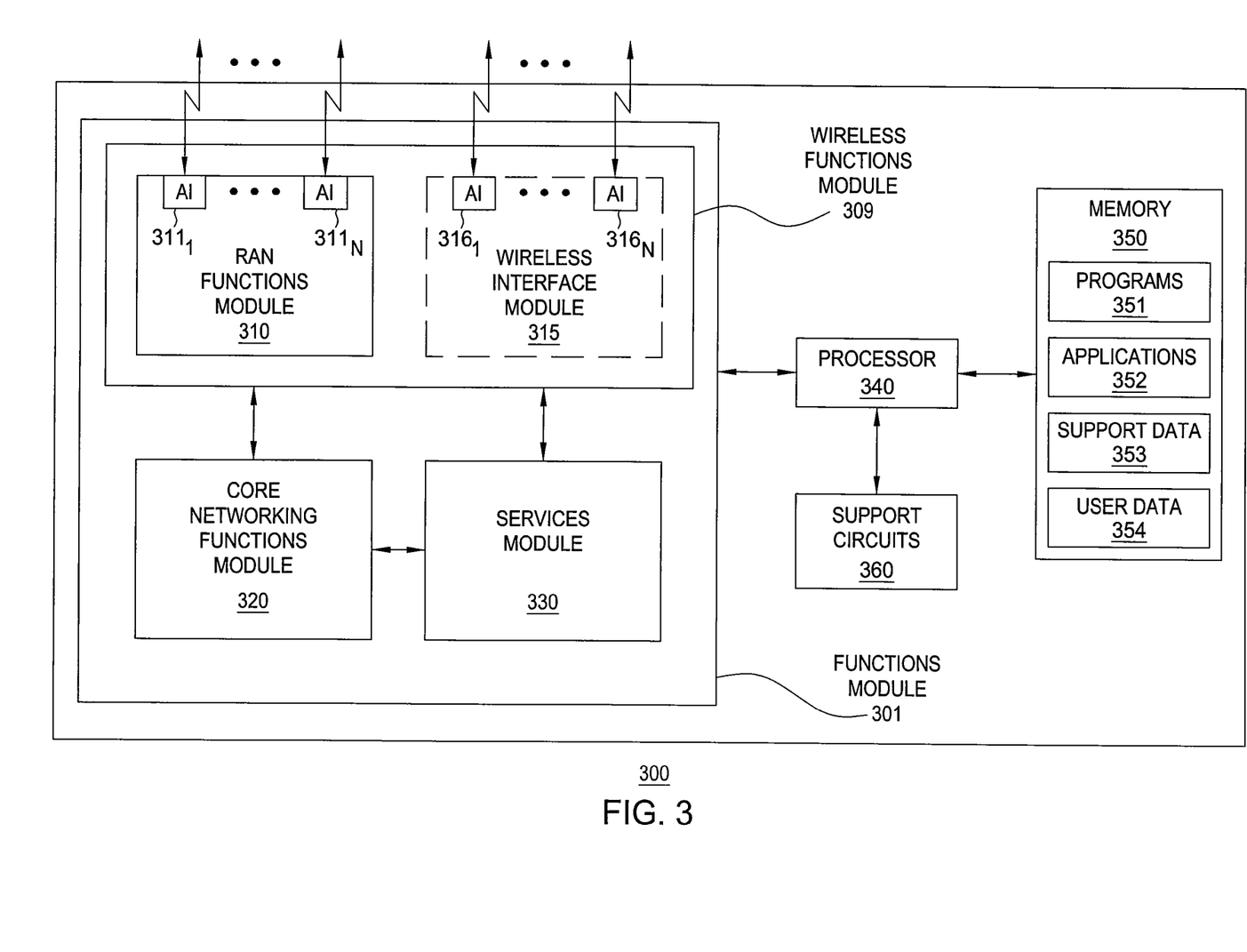
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information.

The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

In emergency situations, emergency vehicles often arrive at and leave from emergency sites at different times, depending on the location from which the emergency vehicles are dispatched and the location of the emergency site. Furthermore, depending on the scope of the emergency, emergency vehicles from one or more neighboring jurisdictions may be dispatched to assist in responding to the emergency. As a result, an emergency vehicle may arrive at an emergency site after a rapidly deployable wireless network has already been established at the emergency site (e.g., using rapidly deployable nodes placed on emergency vehicles already at the emergency site), as depicted and described with respect to FIG. 3.

Figure 4:
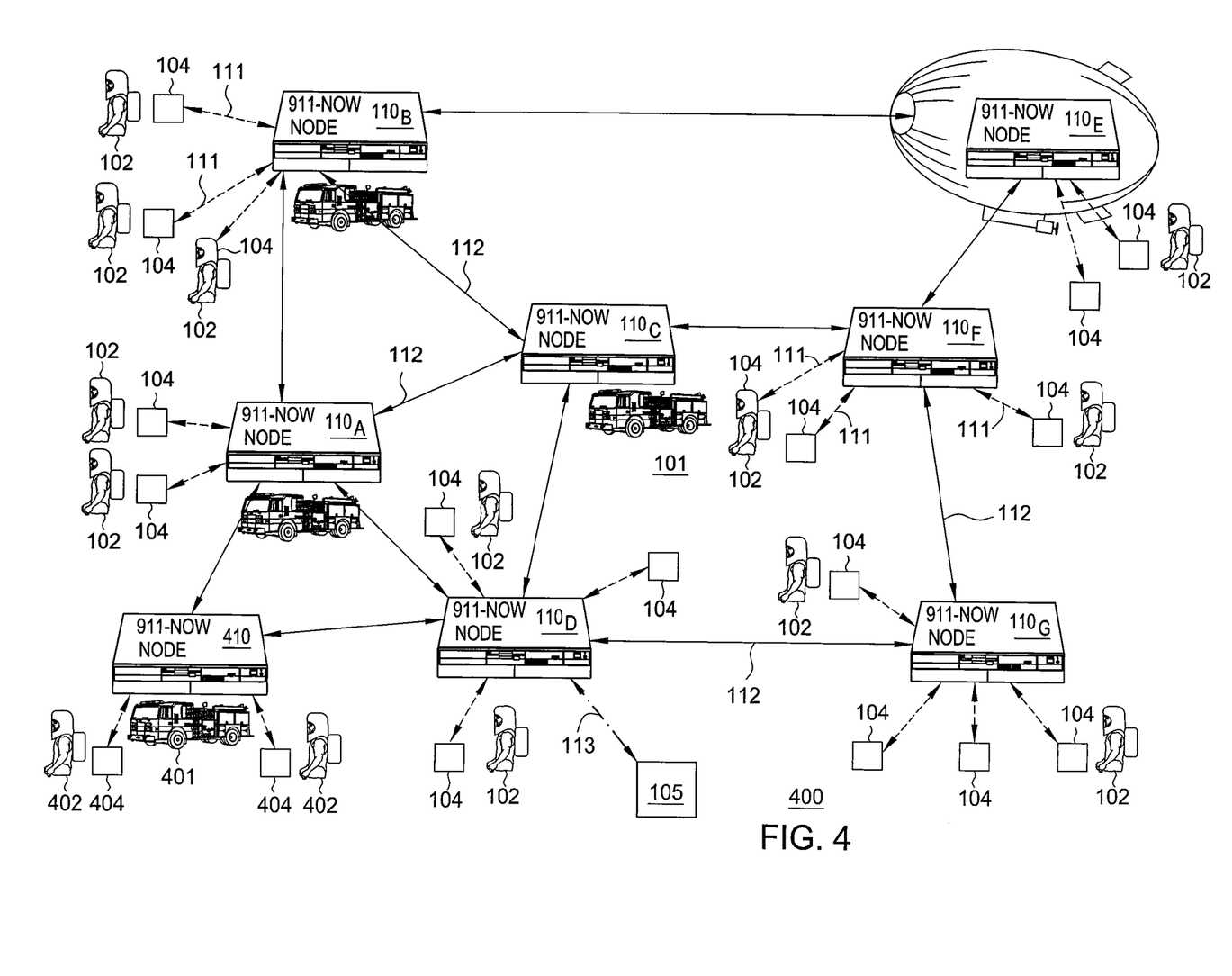
FIG. 4 depicts the 911-NOW communication network architecture of FIG. 1 in which a visiting 911-NOW node arrives at the emergency site.

FIG. 4 depicts the 911-NOW communication network architecture of FIG. 1 in which an additional 911-NOW node arrives at the emergency site. Although primarily depicted and described within the context of a standalone wireless network (illustratively, standalone wireless network of FIG. 1), the present invention may also be used in an integrated wireless network (e.g., such as the integrated wireless network of FIG. 2). As depicted in FIG. 4, an emergency vehicle 401 (depicted as a fire truck) arrives at emergency site 101. The emergency vehicle 401 includes additional 911-NOW node 410 which, upon arriving at emergency site 101, may be immediately required to support communications at emergency site 101, including communications by emergency personnel 402 transported to emergency site 101 by emergency vehicle 401, as well as communications by other users 102 already at emergency site 101.

In order for 911-NOW node 410 to support communications at emergency site 101, the base station portion of 911-NOW node 410 must be activated. The activation of a base station typically requires time for an initial boot-up of the base station, time for at least one power amplifier to warm up, and time for configuration of base station parameters (which may optionally include performing GPS synchronization). In one embodiment, to ensure that the base station portion of 911-NOW node 410 is available to support communications immediately upon arriving at emergency site 101, a multi-phase base station activation process may be implemented such that at least a portion of the base station activation procedure occurs before emergency vehicle 401 arrives at emergency site 101 (e.g., while emergency vehicle 401 is en route to emergency site 101).

In one embodiment, a first phase of the base station activation process is performed while emergency vehicle 401 is en route to emergency site 101, and a second phase of the base station activation process is performed when the emergency vehicle arrives at emergency site 101. During the first phase, the power amplifier of the base station is warmed up, and base station configuration may be performed (which may include activities such as setting one or more base station configuration parameters, attempting to establish GPS synchronization, and the like, as well as various combinations thereof). During the first phase, RF transmissions are disabled. During the second phase, RF transmissions are enabled, thereby enabling the base station of 911-NOW node 410 to support communications at emergency site 101.

As described herein, the multi-phase base station activation process may be implemented for activating base stations in any type of network (not just for activating base stations in rapidly deployable wireless networks deployed during emergency situations). Similarly, as described herein, the multi-phase base station activation process may be implemented for activating various other types of wireless transmission equipment (whether part of a mobile wireless network infrastructure or a fixed wireless network infrastructure). As such, a more general base station activation process is depicted and described herein with respect to FIG. 5.

Figure 5:
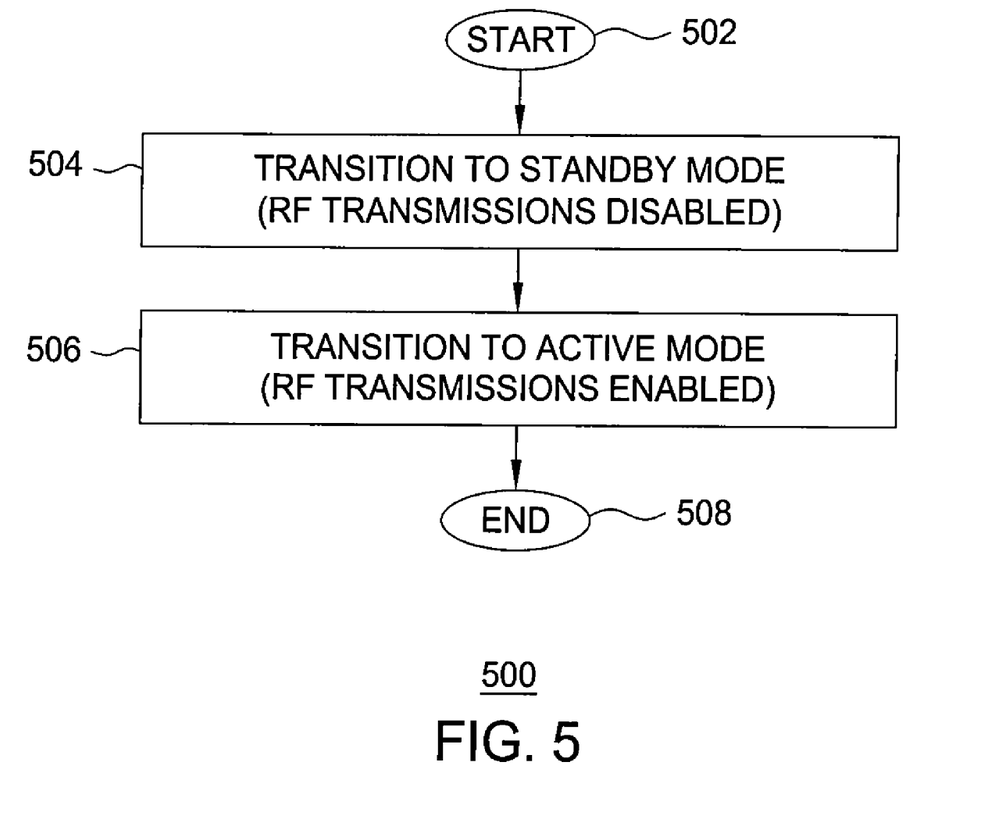
FIG. 5 depicts a method according to one embodiment of the present invention.

FIG. 5 depicts a method according to one embodiment of the present invention. Specifically, method 500 of FIG. 5 includes a method for activating a base station using a multi-phase process, i.e., by transitioning the base station through multiple modes. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, the base station transitions to a standby mode. In one embodiment, the base station may transition to the standby mode from a boot-up mode during which the base station operating system boots up. While in the standby mode, the base station performs a number of activities required to be performed before the base station supports wireless communications (referred to herein as base station activation activities). First, the power amplifier (or amplifiers) of the base station is warmed up. Second, the base station may be configured, which may include setting base station configuration parameters, establishing GPS synchronization, and other base station configuration activities. While in the standby mode, RF transmission capabilities of the base station are disabled.

At step 506, the base station transitions to an active mode. The base station transitions to the active mode from the standby mode. While in the active mode, the base station is able to support wireless communications (e.g., wireless access communications for user devices, wireless mesh and backhaul communications with other base stations, and the like). In order to support wireless communications, RF transmission capabilities of the base station must be enabled. As such, during the transition of the base station from the standby mode to the active mode, the RF transmission capabilities of the base station are switched from being disabled (or locked) to being enabled (or unlocked). As such, upon entering the active mode, the base station is able to support wireless communications using RF transmission capabilities.

In one embodiment, the base station transitions from the standby mode to the active mode in response to a trigger. The trigger may be an automatic trigger (i.e., without operator intervention) or a manual trigger (i.e., with operator intervention). In this embodiment, although the base station may have completed all necessary base station activation activities required in order for the base station to support wireless communications, the base station remains in the standby mode until detecting a trigger which initiates a transition of the base station from the standby mode to the active mode. A trigger may also be used to transition the base station into the standby mode.

Referring back to FIG. 4, for example, a base station included within 911-NOW node 410 transported to emergency site 101 on emergency vehicle 401 may transition to the standby mode either at the emergency dispatch location (e.g., the fire station) or while the emergency vehicle is en route to emergency site 101. For example, the base station within 911-NOW node 410 of emergency vehicle 401 may be automatically powered on and transitioned into the standby mode upon an emergency responder starting the emergency vehicle, or in response to an emergency responder pressing one or more buttons in the cab of emergency vehicle 401 (or on another part of emergency vehicle 401 which provides an operator interface to 911-NOW node 410, e.g., using a management device).

Similarly, referring back to FIG. 4, for example, a base station included within 911-NOW node 410 transported to emergency site 101 on emergency vehicle 401 may transition from the standby mode to the active mode either while the emergency vehicle is en route to emergency site 101, or upon the arrival of emergency vehicle 401 at emergency site 101. For example, the manual trigger which causes the base station to transition from the standby mode to the active mode may be the pressing of a button by the operator. For example, upon arriving at an emergency site, an emergency responder may press a button in the cab of emergency vehicle 401 (or on another part of emergency vehicle 401 which provides an operator interface to 911-NOW node 410) to transition the base station from the standby mode to the active mode.

At step 508, method 500 ends. Although omitted for purposes of clarity, the base station may follow a base station deactivation procedure that is essential the reverse of the base station activation procedure (namely, the base station transitions from the active mode in which RF transmissions are enabled to the standby mode in which RF transmissions are disabled, and may then be shut down and powered off). Although primarily depicted and described with respect to modes, the base station may be equivalently considered to support phases or states. A state transition diagram according to one embodiment by which method 500 of FIG. 5 may be implemented is depicted and described herein with respect to FIG. 6.

Figure 6:
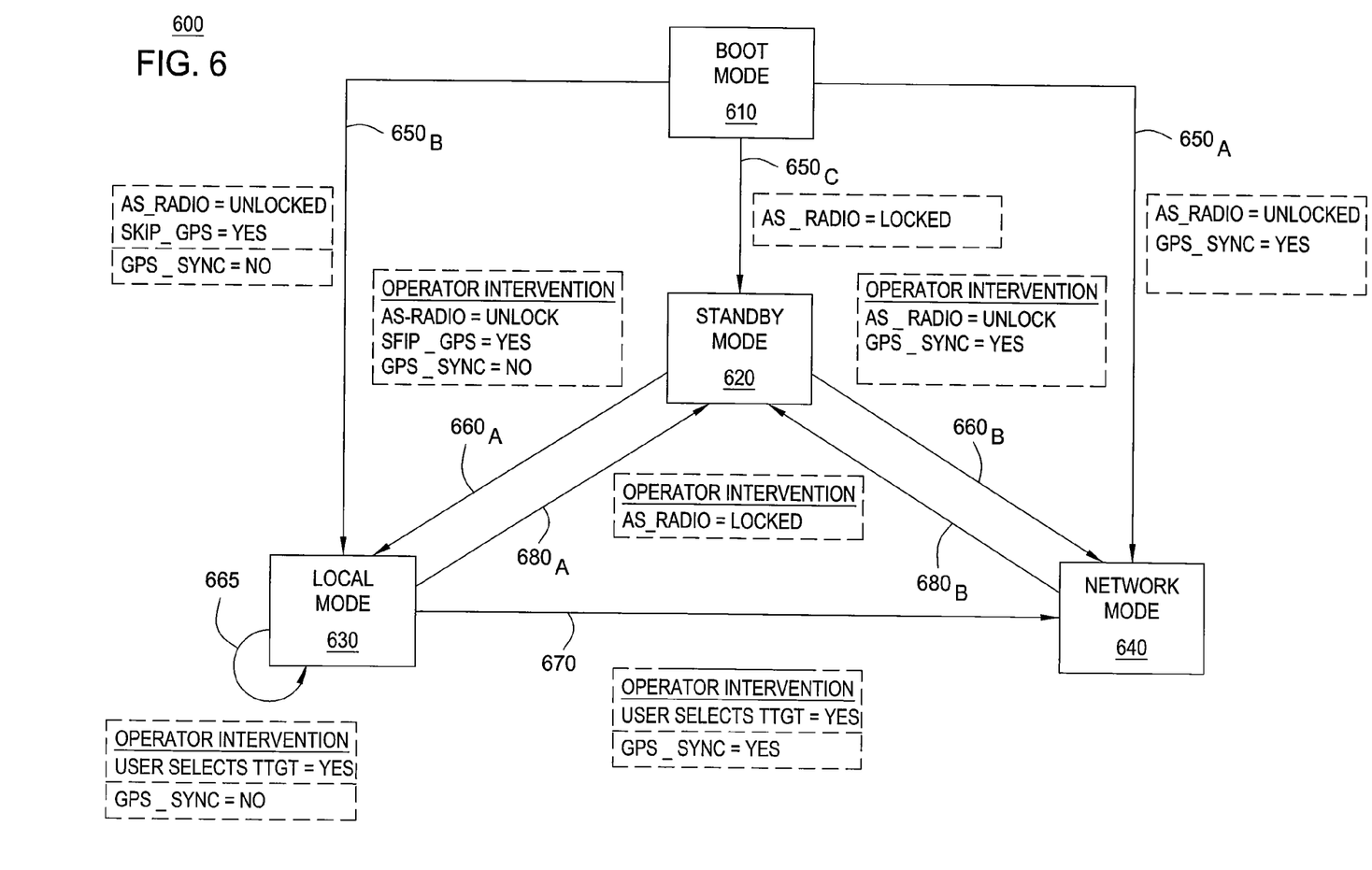
FIG. 6 depicts a state transition diagram according to one embodiment of the present invention.

FIG. 6 depicts a state transition diagram according to one embodiment of the present invention. The state transition diagram 600 is a state transition diagram describing a multi-stage process for activating a base station. The state transition diagram 600 includes four modes: a boot mode 610, a standby mode 620, a local mode 630, and a network mode 640. The state transition diagram 600 includes a number of state transitions. The state transitions are controlled using a number of parameters, including non-operator-controllable parameters (which, although not controllable, may be observable by the operator) and operator-controllable parameters.

The boot mode 610 is a mode in which the base station boots up. The standby mode 620 is an intermediate mode between boot mode 610 and other modes in which the base station is enabled to communicate (illustratively, local mode 630 and network mode 640). The standby mode 620 is a mode in which the power amplifier of the base station warms up and in which base station configuration parameters may be set before the base station is transitioned to one of the other modes in which the base station is enabled to communicate (i.e., local mode 630 or network mode 640). Thus, standby mode 620 enables the two-phase base station activation process by providing an intermediate mode during which time-consuming activities (i.e., power amplifier warm-up and parameter configuration) may be performed.

The local mode 630 and network mode 640 include modes in which RF communications by the base station have been enabled such that the base station is fully operational for supporting call processing. The local mode 530 is a mode in which the base station has not established GPS synchronization (either because it has not attempted to, or is unable to) and, thus, is unable to handoff wireless user devices to other base stations due to a lack of proper timing information. In this local mode, the base station may simply support communications between users associated with that base station. The network mode 640 is a mode in which the base station has established GPS synchronization and, thus, is able to obtain timing information required to perform handoffs of wireless user devices to other base stations.

The state transition diagram 600 includes a number of state transitions between the different modes. The state transitions include a state transition $650_A$ from boot mode 610 to network mode 640, a state transition $650_B$ from boot mode 610 to local mode 630, a state transition $650_C$ from boot mode 610 to standby mode 620, a state transition $660_A$ from standby mode 620 to local mode 630, a state transition $660_B$ from standby mode 620 to network mode 640, a state transition 665 looping within local mode 630, a state transition 670 from local mode 630 to network mode 640, a state transition $680_A$ from local mode 630 to standby mode 620, and a state transition $680_B$ from network mode 640 to standby mode 620.

The state transitions between modes are controlled using parameters, including operator-controlled parameters (which are capable of being changed by an operator) and non-operator-controlled parameters (which are capable of being observed by an operator). The operator-controlled parameters include: (1) a parameter indicative of the current administrative state of radios of the base station (denoted as AS_Radio); (2) a parameter indicative of whether or not the base station should attempt to establish GPS synchronization (denoted as Skip_GPS); and (3) a parameter indicative of whether the base station should attempt to transition from a state in which GPS synchronization is not established to a state in which GPS synchronization is established (denoted as Transition_To_GPS_Time (TTGT)). The non-operator-controlled parameter(s) include: a parameter indicative of whether GPS synchronization has been established (denoted as GPS_Sync). Fewer or more parameters (or different parameters) may be used. The use of these parameters may be better understood with reference to state transition diagram 600.

As depicted in FIG. 6, when a base station is powered up, the base station enters a boot mode 610. In boot mode 610, the base station operating systems boots up, and other boot procedures may be performed by the base station. From the boot mode 610, the base station may transition to standby mode 620 (via state transition $650_C$), local mode 630 (via state transition $650_B$), or network mode 640 (via state transition $650_A$). The transition from boot mode 610 depends on values of parameters of the base station (namely, on the AS_Radio parameter and, optionally, on the GPS_Sync and Skip_GPS parameters). In one embodiment, the AS_Radio parameter is a persistent parameter such that the value of the AS_Radio parameter at boot-up of the base station is the value of the AS-Radio parameter when the base station was last shut down.

In order to determine whether or not to enter standby mode 620 from boot mode 610, the base station checks the value of the AS_Radio parameter. If the AS_Radio parameter is set to LOCKED, the base station will transition from boot mode 610 to standby mode 620. If the AS_Radio parameter is set to UNLOCKED, the base station may transition to either local mode 630 or network mode 640 (depending on whether or not GPS synchronization is required). If the AS_Radio parameter is set to UNLOCKED and the Skip_GPS parameter is set to YES, the base station will transition to local mode 630 (and the GPS_Sync parameter will be NO). If the AS_Radio parameter is set to UNLOCKED and the GPS_Sync parameter is set to YES, the base station will transition to network mode 640.

Since existing base stations do not support the AS_Radio parameter (or any equivalent parameter), existing base stations do not support standby mode 620; rather, existing base stations must transition directly from boot mode 610 either to local mode 630 or to network mode 640 (both of which are modes in which RF transmissions are enabled). In other words, in existing base stations which do not support standby mode 620, RF transmissions are enabled during the base station activation process (i.e., during warming of the base station power amplifier and/or during setting of base station configuration parameters). Thus, arrival of an existing base station to a site at which other base stations are already operating would produce interference due to initially-incorrect base station configurations and transmit power settings of the arriving base station.

As described herein, while in standby mode 620, a number of activities are performed while RF transmission capabilities of the base station are disabled. First, while the base station is in standby mode 620, the power amplifier of the base station warms up. Second, while the base station is in standby mode 620, the base station may be configured. The configuration of the base station in standby mode 620 may include many different activities. Thus, standby mode 620 enables time-consuming portions of the base station activation process to be performed before the base station will be needed to support wireless communications (e.g., before the base station arrives at the deployment site).

The configuration of the base station may include GPS synchronization processing (which may be attempted automatically while in standby mode 620 or attempted in response to operator intervention while in standby mode 620). The configuration of the base station may include setting of base station configuration parameters. For example, although base station configuration parameters may be preset to default values, at least some of the base station configuration parameters require operator intervention, such as transmission frequencies, identity parameters, (e.g., PN offsets in the case of CDMA-based base stations, neighbor lists in the case of cellular base stations, and the like), and the like, as well as various combinations thereof. The base station configuration parameters may be set by an operator using a management interface.

As depicted in FIG. 6, if the base station transitions to standby mode 620, the base station remains in standby mode 620 until some external trigger is detected. In one embodiment, the external trigger is automatically detected by the base station (i.e., operator intervention is not required). In one embodiment, the external trigger involves intervention by an operator to transition the base station from standby mode 620 to one of the active modes (illustratively, either to local mode 630 or network mode 640). For example, an operator may press a particular button (e.g., on the base station, a button in the cab of the mobile vehicle transporting the base station, and the like) in order to transition the base station from standby mode 620 to one of the active modes.

In one embodiment, in which the external trigger involves intervention by an operator, the operator may specifically transition the base station from standby mode 620 to either local mode 630 or network mode 640 (i.e., the operator selects the active mode to which the base station is transitioned, possibly by observing current values of one or more of the state transition parameters). In one embodiment, in which the external trigger involves intervention by an operator, the operator may simply indicate that the base station should be transitioned from standby mode 620 to one of the active modes without specifying which active mode to which the base station should be transitioned (i.e., the base station determines whether to enter local mode 630 or network mode 640 depending on one or more of the state transition parameters).

As depicted in FIG. 6, transition of the base station from standby mode 620 to one of the active modes involves changing the value of the AS_Radio parameter from LOCKED to UNLOCKED, which switches RF transmission capabilities of the base station from being disabled (AS_Radio=LOCKED) to being enabled (AS_Radio=UNLOCKED). If GPS synchronization is not desired (Skip_GPS=YES) or cannot be established (GPS_Sync=NO), the base station transitions from standby mode 620 to local mode 630 (illustratively, state transition 660$_A$). If GPS synchronization is desired (Skip_GPS=NO) and can be established (GPS_Sync=YES), the base station transitions from standby mode 620 to network mode 630 (illustratively, state transition 660$_B$).

In either active mode, RF transmission capabilities of the base station are enabled (AS_Radio=UNLOCKED) and, thus, the base station can support wireless communications. In local mode 630, the base station can only support wireless communications between user devices associated with that base station (i.e., the base station cannot handoff user devices to other base stations). In network mode 640, the base station can support wireless access communications for user devices associated with that base station and wireless backhaul communications with other base stations (i.e., the base station operates in an integrated mode enabling communications with other base stations, including user devices associated with other base stations, as well as other devices reachable via other base stations).

As depicted in FIG. 6, the base station can transition from local mode 630 to network mode 640. The transition from local mode 630 to network mode 640 may be automatic (e.g., initiated by the base station). The transition from local mode 630 to network mode 640 may be manual (e.g., initiated by an operator). Although omitted for purposes of clarity, the base station may also transition from network mode 640 to local mode 630 (although such transitions are rare since network mode 640 provides more comprehensive communication capabilities that local mode 630).

The transition from local mode 630 to network mode 640 may be automatic. For example, where the base station is attempting to establish GPS synchronization but is unable to establish GPS synchronization before entering local mode 630 (e.g., directly from boot mode 610, or from standby mode 620 in response to an external trigger), the base station may enter local mode 630 while continuing to attempt to establish GPS synchronization. In this example, the base station remains in local mode 630 until GPS synchronization is established (i.e., until GPS_Sync changes from NO to YES). This is depicted as state transition 665, which loops within local mode 630. After GPS synchronization is established, the base station transitions from local mode 630 to network mode 640. This is depicted as state transition 670.

The transition from local mode 630 to network mode 640 may be manual (e.g., initiated by an operator). For example, the base station may transition to local mode 630 (either directly from boot mode 610 or indirectly from standby mode 620) and remain in local mode 630 until an operator initiates a transition from local mode 630 to network mode 640. The operator may initiate the transition from local mode 630 to network mode 640 by changing the TTGT parameter from NO to YES, thereby triggering the base station to attempt to establish GPS synchronization. In this example, the base station remains in local mode 630 until GPS synchronization is established (i.e., until GPS_Sync changes from NO to YES). This is depicted as state transition 665, which loops within local mode 630. After GPS synchronization is established, the base station transitions from local mode 630 to network mode 640. This is depicted as state transition 670.

As depicted in FIG. 6, the base station may transition from either of the active modes back to standby mode 620. The transition from local mode 630 to standby mode 620 is depicted as state transition 680$_A$. The transition from network mode 640 to standby mode 620 is depicted as state transition 680$_B$. The transition from an active mode back to standby mode 620 is initiated in response to an operator intervention (e.g., pressing a button or entering one or more commands via a management interface). The transition from an active mode back to standby mode 620 (which results in a change of the value of AS_Radio from UNOCKED to LOCKED) may be a first step in deactivating the base station. Although omitted for purposes of clarity, from standby mode 620, the base station may be powered off.

Figure 7:
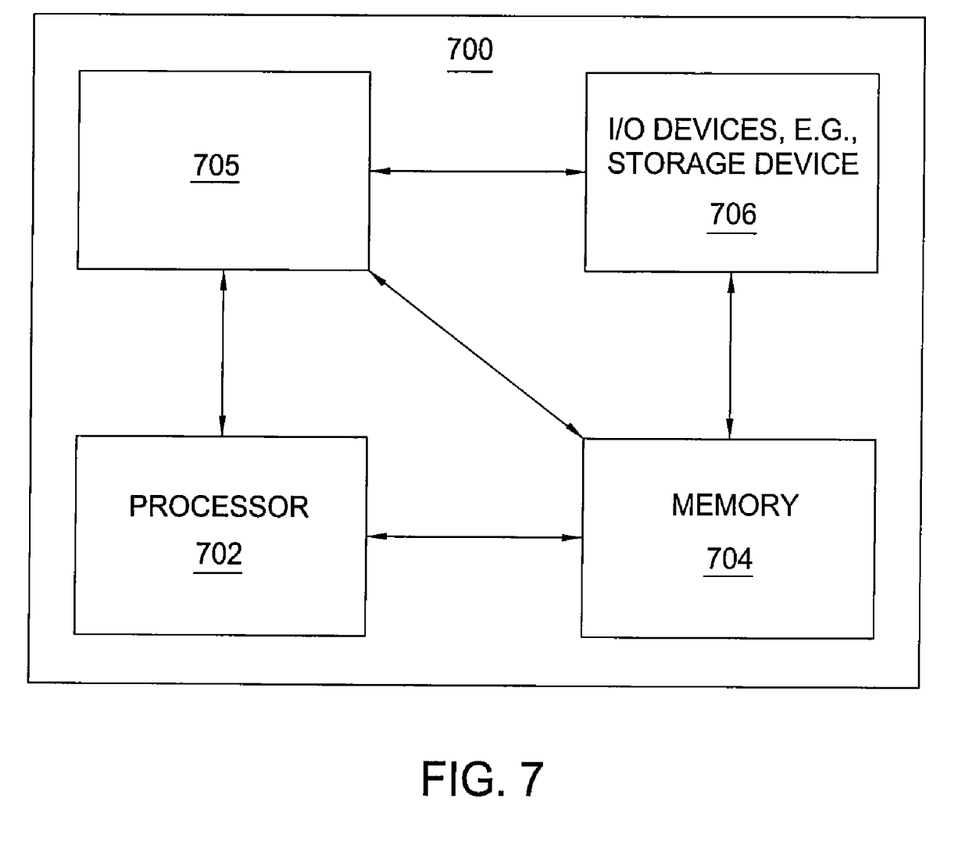
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a base station activation module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present base station activation process 705 can be loaded into memory 704 and executed by processor 702 to implement the functions as discussed above. As such, base station activation process 705 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Although primarily depicted and described with respect to rapidly deployable networks, the present invention may be used to provide base station activation for any type of base station deployed in any type of network. Although primarily depicted and described with respect to specific wireless transmission technologies (e.g., EV-DO), the present invention may be used to provide base station activation for any wireless transmission technology (e.g., UMTS, HSDPA, WiMAX, and the like). Although primarily depicted and described with respect to activating base stations, the present invention may be used to activate any type of wireless transmission equipment requiring equipment activation activities (e.g., warming of a power amplifier, setting of configuration parameters, and the like) to be performed before the wireless transmission equipment provides wireless communications services. Thus, the present invention is not intended to be limited by the type of wireless network (or wireless transmission technology), type of wireless transmission equipment, or other specific implementations depicted and described herein.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for activating a base station, comprising:
transitioning the base station, based on a parameter associated with radio frequency (RF) transmissions of the base station, from a boot state to a standby state in which at least one base station activation activity is performed and RF transmissions are disabled, wherein the parameter associated with RF transmissions of the base station is indicative as to whether RF transmission capabilities of the base station are enabled or disabled, wherein the at least one base station activation activity comprises at least one of warming at least one power amplifier, setting at least one base station configuration parameter, and establishing Global Positioning System (GPS) synchronization; and
transitioning the base station from the standby state to an active state in which RF transmissions are enabled.

2. The method of claim 1, wherein the base station is transitioned from the boot state to the standby state in response to completion of a boot-up procedure.

3. The method of claim 1, wherein transitioning the base station from the standby state to the active state is based on the parameter associated with RF transmissions of the base station.

4. The method of claim 1, wherein transitioning the base station from the standby state to the active state is initiated in response to a trigger.

5. The method of claim 1, wherein the active state comprises one of a local mode in which GPS synchronization is not established and a normal mode in which GPS synchronization is established.

6. The method of claim 1, wherein the active state is a local mode in which GPS synchronization is not established, further comprising:
transitioning the base station from the local mode to a normal mode in which GPS synchronization is established.

7. A non-transitory computer readable storage medium storing a software program, that, when executed by a computer, causes the computer to perform a method for activating a base station, the method comprising:
transitioning the base station, based on a parameter associated with radio frequency (RF) transmissions of the base station, from a boot state to a standby state in which at least one base station activation activity is performed and RF transmissions are disabled, wherein the parameter associated with RF transmissions of the base station is indicative as to whether RF transmission capabilities of the base station are enabled or disabled, wherein the at least one base station activation activity comprises at least one of warming at least one power amplifier, setting at least one base station configuration parameter, and establishing Global Positioning System (GPS) synchronization; and
transitioning the base station from the standby state to an active state in which RF transmissions are enabled.

8. The non-transitory computer readable storage medium of claim 7, wherein the base station is transitioned from the boot state to the standby state in response to completion of a boot-up procedure.

9. The non-transitory computer readable storage medium of claim 7, wherein transitioning the base station from the standby state to the active state is based on the parameter associated with RF transmissions of the base station.

10. The non-transitory computer readable storage medium of claim 7, wherein transitioning the base station from the standby state to the active state is initiated in response to a trigger.

11. The non-transitory computer readable storage medium of claim 7, wherein the active state comprises one of a local mode in which GPS synchronization is not established and a normal mode in which GPS synchronization is established.

12. The non-transitory computer readable storage medium of claim 7, wherein the active state is a local mode in which GPS synchronization is not established, the method further comprising:
   transitioning the base station from the local mode to a normal mode in which GPS synchronization is established.

13. An apparatus for activating a base station, comprising:
   a processor configured to:
      transition the base station, based on a parameter associated with radio frequency (RF) transmissions of the base station, from a boot state to a standby state in which at least one base station activation activity is performed and RF transmissions are disabled, wherein the parameter associated with RF transmissions of the base station is indicative as to whether RF transmission capabilities of the base station are enabled or disabled, wherein the at least one base station activation activity comprises at least one of warming at least one power amplifier, setting at least one base station configuration parameter, and establishing Global Positioning System (GPS) synchronization; and
      transition the base station from the standby state to an active state in which RF transmissions are enabled.

14. The apparatus of claim 13, wherein transitioning the base station from the standby state to the active state is initiated in response to a trigger.

15. The apparatus of claim 13, wherein the base station is transitioned from the boot state to the standby state in response to completion of a boot-up procedure.

16. The apparatus of claim 13, wherein transitioning the base station from the standby state to the active state is based on the parameter associated with RF transmissions of the base station.

17. The apparatus of claim 13, wherein the active state comprises one of a local mode in which GPS synchronization is not established and a normal mode in which GPS synchronization is established.

18. The apparatus of claim 13, wherein the active state is a local mode in which GPS synchronization is not established, wherein the processor is configured to:
   transition the base station from the local mode to a normal mode in which GPS synchronization is established.

* * * * *